(12) United States Patent
Lu

(10) Patent No.: US 12,408,741 B2
(45) Date of Patent: Sep. 9, 2025

(54) STAND FOR A HANDHELD DEVICE, MEANS THEREOF, AND A PROTECTIVE CASE HAVING SAME

(71) Applicant: Evolutive Labs Co., Ltd., Taipei (TW)

(72) Inventor: Jui-Chen Lu, Taichung (TW)

(73) Assignee: EVOLUTIVE LABS CO., LTD., Taipei (TW)

( * ) Notice: Subject to any disclaimer, the term of this patent is extended or adjusted under 35 U.S.C. 154(b) by 286 days.

(21) Appl. No.: 17/976,327

(22) Filed: Oct. 28, 2022

(65) Prior Publication Data
US 2023/0165347 A1    Jun. 1, 2023

(30) Foreign Application Priority Data

Nov. 30, 2021    (TW) .................................. 110144551

(51) Int. Cl.
*F16M 13/00*    (2006.01)
*A45C 11/00*    (2006.01)
*H04M 1/12*    (2006.01)

(52) U.S. Cl.
CPC ........... *A45C 11/00* (2013.01); *F16M 13/005* (2013.01); *H04M 1/12* (2013.01); *A45C 11/002* (2025.01);
(Continued)

(58) Field of Classification Search
CPC ..... A45F 5/1516; F16M 11/10; F16M 13/005
See application file for complete search history.

(56) References Cited

U.S. PATENT DOCUMENTS 8,162,283 B1 *   4/2012   Royz ...................... H04M 1/04
                                                    248/455
8,428,664 B1     4/2013   Wyers
(Continued)

FOREIGN PATENT DOCUMENTS

CN       102022603 A      4/2011
CN       109008099 A      12/2018
(Continued)

OTHER PUBLICATIONS

Office Action mailed Jan. 19, 2023 in parallel U.S. Appl. No. 17/932,926.
(Continued)

*Primary Examiner* — Bradley Duckworth
(74) *Attorney, Agent, or Firm* — Muncy, Geissler, Olds & Lowe, P.C.

(57) ABSTRACT

The invention relates to a stand for hand-held device and a protective case comprising the stand. The stand comprises a first plate, a second plate and a lifting device between the first plate and the second plate. The inner end of the first plate and the inner end of the second plate are pivoted with each other to form a pivoting portion. The lifting device controls the free end portion of the first plate and the free end portion of the second plate to be close to or away from each other. The lifting device comprises a limiting device and an elastic sheet, thereby when one end of the elastic sheet moves along the length direction of the second plate, and construes a first displacement relative to the pivoting portion, the free end portion of the first plate is driven up to form a second displacement relative to the free end portion of the second plate.

20 Claims, 19 Drawing Sheets

(52) U.S. Cl.
CPC ......... *A45C 11/003* (2025.01); *A45C 2200/15* (2013.01)

(56) References Cited

U.S. PATENT DOCUMENTS

| | | | |
|---|---|---|---|
| 8,567,832 | B2 | 10/2013 | Kannaka |
| 8,950,638 | B2 | 2/2015 | Wangercyn |
| 9,538,675 | B2* | 1/2017 | Le Gette ............... F16M 11/105 |
| 10,063,272 | B1* | 8/2018 | Yeo ........................... A45F 5/00 |
| 10,694,837 | B1* | 6/2020 | Altschul ................. A45C 13/30 |
| 11,058,194 | B2* | 7/2021 | Mora ....................... H04M 1/04 |
| 11,140,970 | B2 | 10/2021 | Yeo |
| 11,274,697 | B2 | 3/2022 | Srour |
| 11,359,761 | B2* | 6/2022 | Liu ......................... F16M 11/10 |
| 11,388,966 | B2* | 7/2022 | Balmer ................... A45C 15/00 |
| 11,486,532 | B1 | 11/2022 | Wang et al. |
| 11,530,779 | B2 | 12/2022 | Epstein et al. |
| 11,572,977 | B2* | 2/2023 | Murphy ................. F16M 13/00 |
| 11,674,633 | B2* | 6/2023 | Cheswick .............. F16M 11/10 248/688 |
| 12,126,372 | B2* | 10/2024 | Lu ........................... H04M 1/04 |
| 2009/0095854 | A1 | 4/2009 | Forbes et al. |
| 2012/0325999 | A1 | 12/2012 | Yang et al. |
| 2015/0335138 | A1 | 11/2015 | Juarbe |
| 2016/0036480 | A1 | 2/2016 | Hirsch |
| 2016/0069512 | A1 | 3/2016 | Grieve |
| 2016/0345715 | A1 | 12/2016 | Lin |
| 2018/0299923 | A1 | 10/2018 | Kuo |
| 2018/0302114 | A1 | 10/2018 | Nielsen |
| 2021/0059370 | A1* | 3/2021 | Del Toro ............. F16M 11/041 |
| 2022/0304457 | A1 | 9/2022 | Cornish et al. |
| 2024/0372937 | A1* | 11/2024 | Lu ....................... H04M 1/0283 |

FOREIGN PATENT DOCUMENTS

| | | |
|---|---|---|
| EM | 008709638-0001 | 10/2021 |
| EM | 008709638-0002 | 10/2021 |
| EM | 008709638-0003 | 10/2021 |
| EM | 008709638-0004 | 10/2021 |
| EM | 008709638-0005 | 10/2021 |
| EM | 008709638-0006 | 10/2021 |
| EM | 008709638-0007 | 10/2021 |
| JP | 3235994 U | 1/2022 |
| KR | 10-2017-0031782 A | 3/2017 |
| WO | WO-2020/009795 A1 | 1/2020 |
| WO | WO2022/212136 A1 | 10/2022 |

OTHER PUBLICATIONS

An English translation of the Office Action issued for corresponding KR application No. 10-2021-0141065 dated Dec. 20, 2022, 11 pages.

An Office Action issued for corresponding IN application No. 202224012146 dated Dec. 19, 2022 with English translation, 5 pages.

* cited by examiner

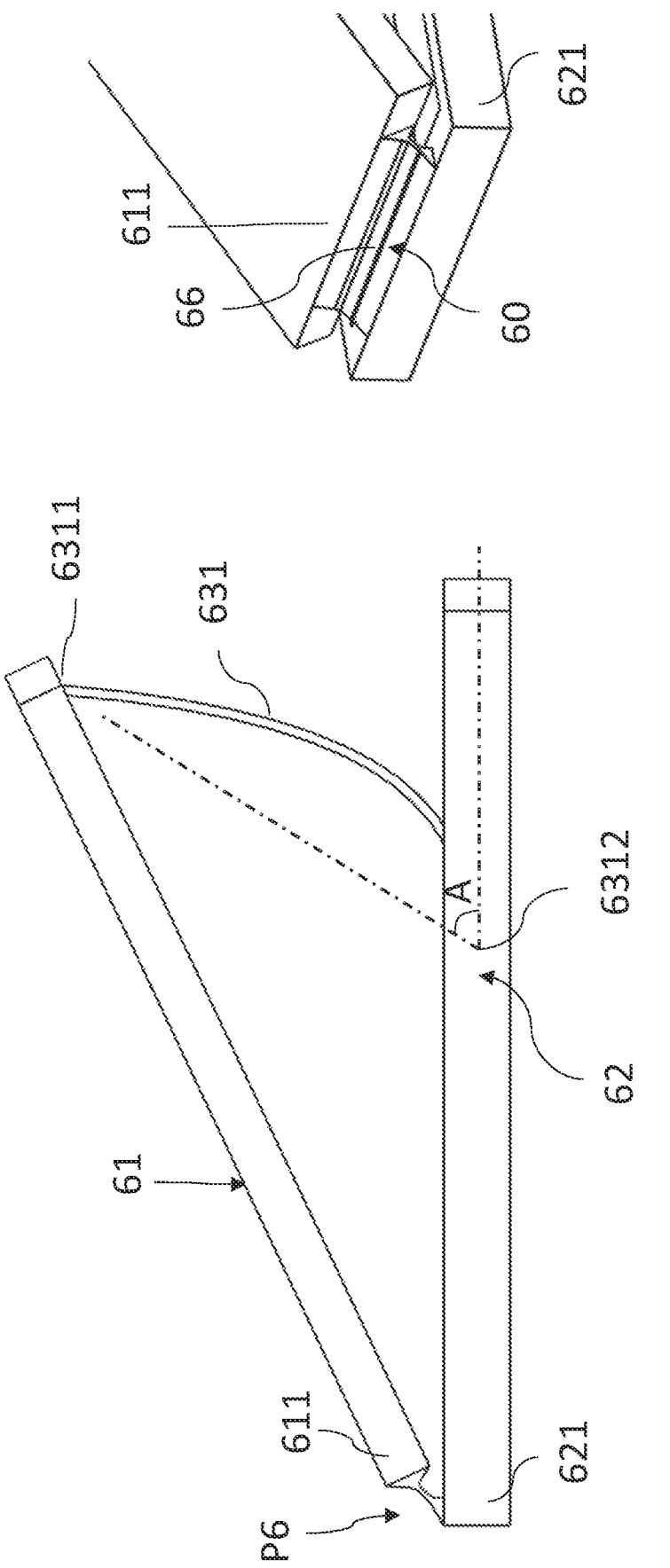

STAND FOR A HANDHELD DEVICE, MEANS THEREOF, AND A PROTECTIVE CASE HAVING SAME

CROSS-REFERENCES TO RELATED APPLICATIONS

This application claims the benefit of the Taiwan Patent Application No. 110144551 filed on Nov. 30, 2021, the subject matter of which is incorporated herein by reference.

BACKGROUND OF THE INVENTION

Field of the Invention

The present invention relates to a stand for a handheld device, especially a collapsible stand for use with a mobile phone or a tablet.

Descriptions of the Related Art

Most of the existing handheld devices have rich entertainment functions, such as video and audio playback, e-book reading and electronic games, etc. Therefore, users often need to continuously use the handheld device, and sometimes turn it from portrait to landscape, so as to be closer to the visual ratio of normal screens. However, due to the flat shape of the handheld device, it does not conform to the ergonomics of the handheld. The user often accidentally drops the handheld device and damage it due to various reasons (such as sore hands, too little friction force, and lack of concentration, etc.). In addition, if the user does not want to hold the handheld device for a long time while watching movies or video, it is needed to have a support against the back of the device, or put it on an extra bracket or tripod, which will cause additional problems such as improper viewing angle. Those are quite inconvenient overall.

Therefore, some people began to put forward the technical means to solve the above problems. A simple retractable stand was attached to the back of the mobile phone, which could be directly attached to the back case of the phone, attached to the protective case, or directly integrated with the protective case for users to purchase products with a stand directly when buying the protective case. Those kinds of stands are most in the foldable "ring" type; however, because of the "ring-type" stand is small in overall size, it should be placed in a right position to facilitate the user's appropriate finger to go through and hold the phone, also at the same time, requiring the cell phone is at a good location. That location often does not provide the phone in in a good viewing angle, and even cannot let the phone to be in a good standing position, not to mention this situation can allow the larger size of the tablet electronic device to be controlled by the user. That is, there is no flexibility of use for the user to freely sustain a mobile phone or tablet in the portrait or landscape position. In other words, the "ring" stand, because of its small size, usually cannot provide both desired functions for a perfect support and an anti-drop. Also, the "ring" stand is usually made of metal, it needs a pivoting structure to fold up the ring when not being in use, therefore the thickness of the whole stand cannot be that thin. Further, its shape is irregular and asymmetric, and is not good-looking. Unless there are other auxiliary mechanism to add on, the phone with the ring-type stand cannot perfectly and flatly lie on the table in a low profile. In overall, it is still a very bad design.

In addition to the "ring" design, some ideas were developed later such as those disclosed in the Chinese Patent Nos. CN305843674S and CN305381641S, which use a flexible strap fixed at one end with the other end being provided with a button, so that the button can slide along a track. When in use, the flexible strap is arched up to a shape like a caterpillar's body, forming an "Ω" shape that lets a user's finger pass through and that is also able to support the phone. Nevertheless, this design is just a similar idea of the above-mentioned "ring" type with using different material to make the user feels more comfortable a bit because the user's finger differently touches the non-metal material. This design does not considerably improve the ring-type stand afterwards.

Recently, some other ideas try to make a breakthrough over the above ring type and provide another sort of stand that can provide spaces to receive credit cards. For example, a South Korean Brand named "SlashGo" used a staggered leather belt design trying to eliminate the shortcomings of the existing stands that are over-protruding out of the back of the phone, making the phone cannot levelly lie on the table in a smooth condition. Also, its states of use between unfolding and folding up are obviously troublesome, and not quite easy and compact. And the leather used for this product is not durable and hard to resist dirt and water. Therefore, it still cannot be popularized.

In view of this, a functional retractable stand needs be researched and developed. No matter it is attached to the back of the phone or attached to the outer surface of the protective case for use with the phone, it can obtain a good support and adjust the best viewing angle of the phone, and other excellent performance in the use state even for the normal or larger-sized phones and tablets. In the fold-up state, it can keep the smallest and most uniform protruding size without influencing the good-looking appearance of the original phones or tablets.

SUMMARY OF THE INVENTION

The primary objective of the present invention is to provide a stand for supporting a handheld device, in which the stand includes a first plate, a second plate, and a lifting device between the first plate and the second plate. The inner end portion of the first plate and the inner end portion of the second plate are pivotally connected to each other and form a pivot portion. The lifting device can control the free end portion of the first plate and the free end portion of the second plate so that they can approach or move away from each other by rotation of the inner end portions about the pivot portion.

The secondary objective of the present invention is to provide a stand, in which the lifting device further includes a limiting device, so that the lifting process of the free end portion of the first plate relative to the free end portion of the second plate can be restricted, so that the first plate is raised to a first dead point relative to the second plate, and lowered to a second dead point being closest to the second plate.

Another objective of the present invention is to provide a stand for supporting a handheld device, in which the limiting device is adapted to guide an end portion of an elastic sheet to move within a limited range along a length direction of the second plate. When the end portion of the elastic sheet and the pivot portion are close to each other, the first plate and the second plate can be driven to approach each other.

Yet a further objective of the present invention is to provide a protective case, which is installed onto the back of a handheld device, and the protective case includes the above-mentioned stand.

BRIEF DESCRIPTION OF THE DRAWINGS

FIG. 6A is a side view showing another embodiment of the pivot portion.

FIG. 6B is a partial enlarged perspective view of the pivot portion of FIG. 6A.

DESCRIPTION OF THE PREFERRED EMBODIMENT

Figure 1A:
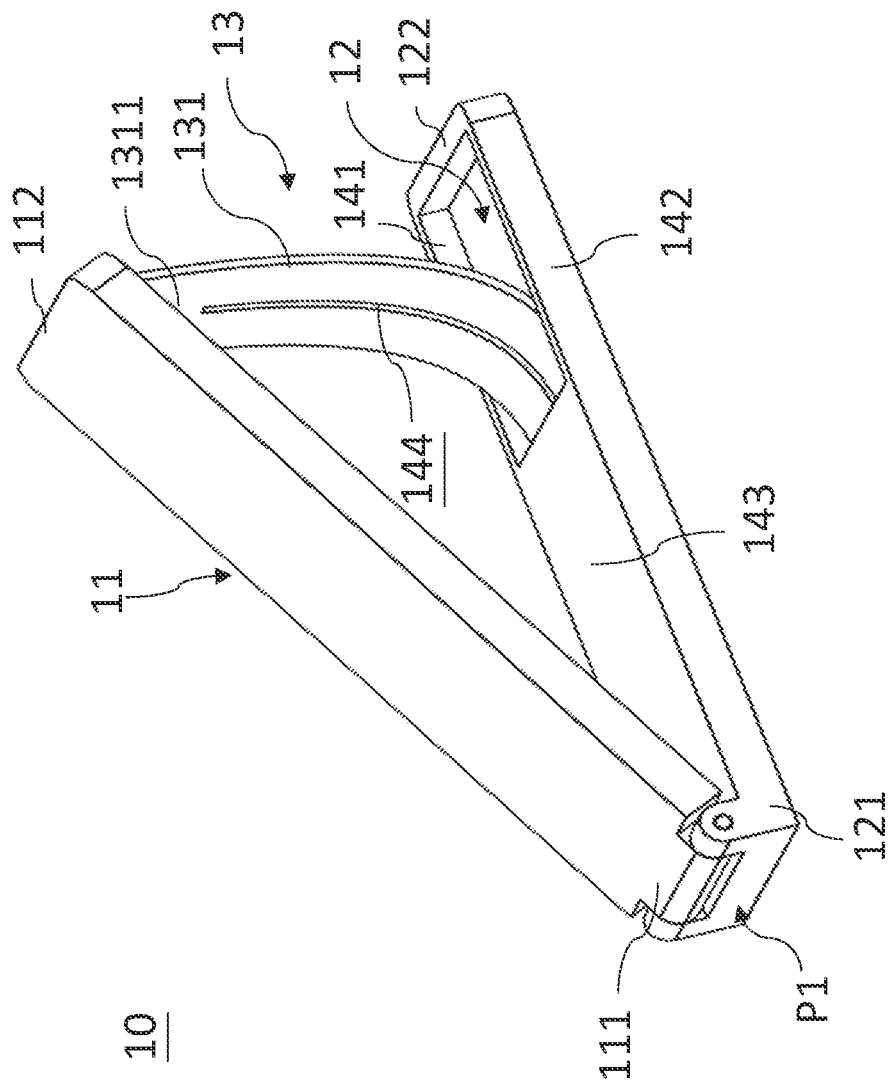
FIG. 1A is a perspective view of a preferred first embodiment of the present invention, showing that the stand is fully raised.
Figure 1B:
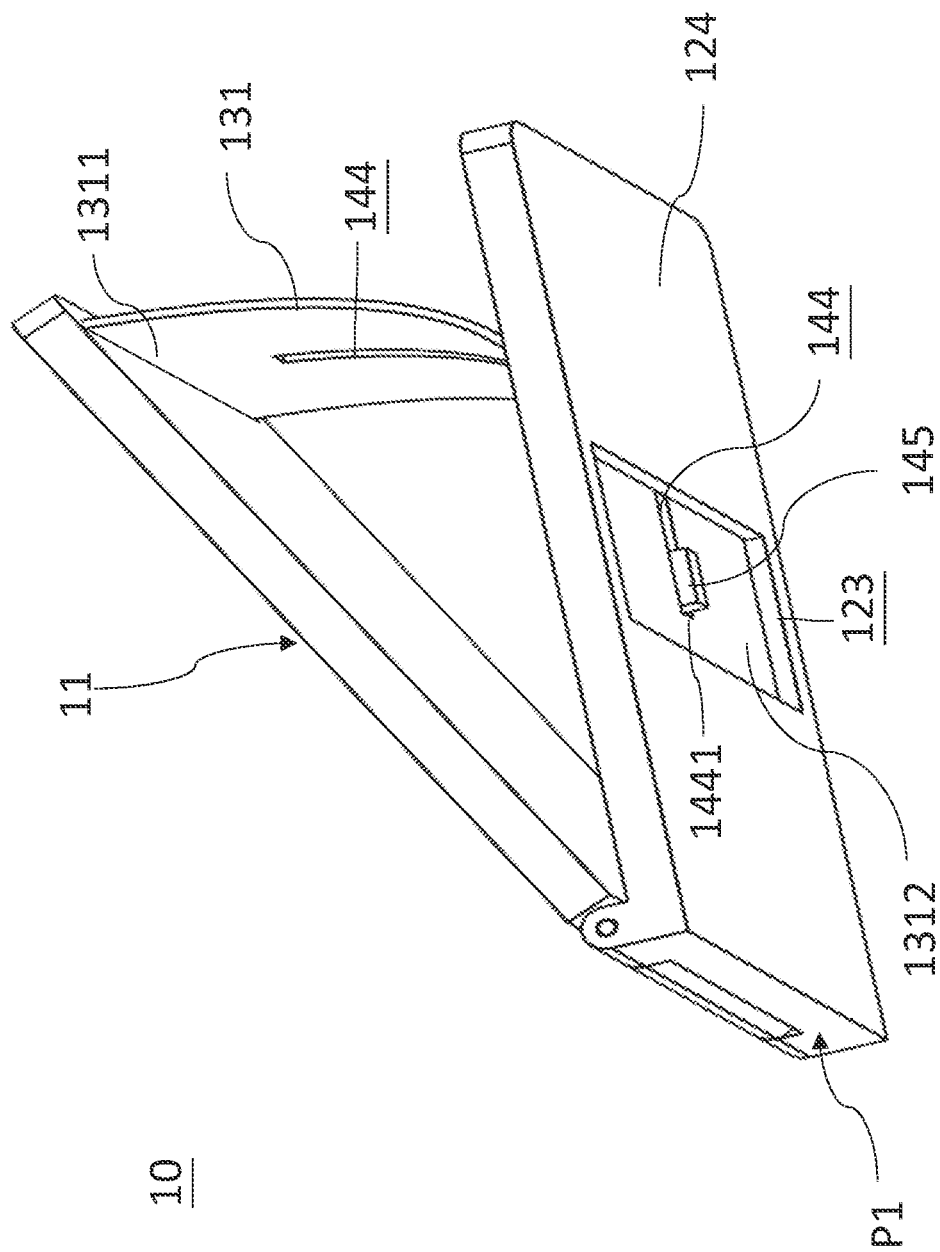
FIG. 1B is another perspective view of FIG. 1A.
Figure 1C:
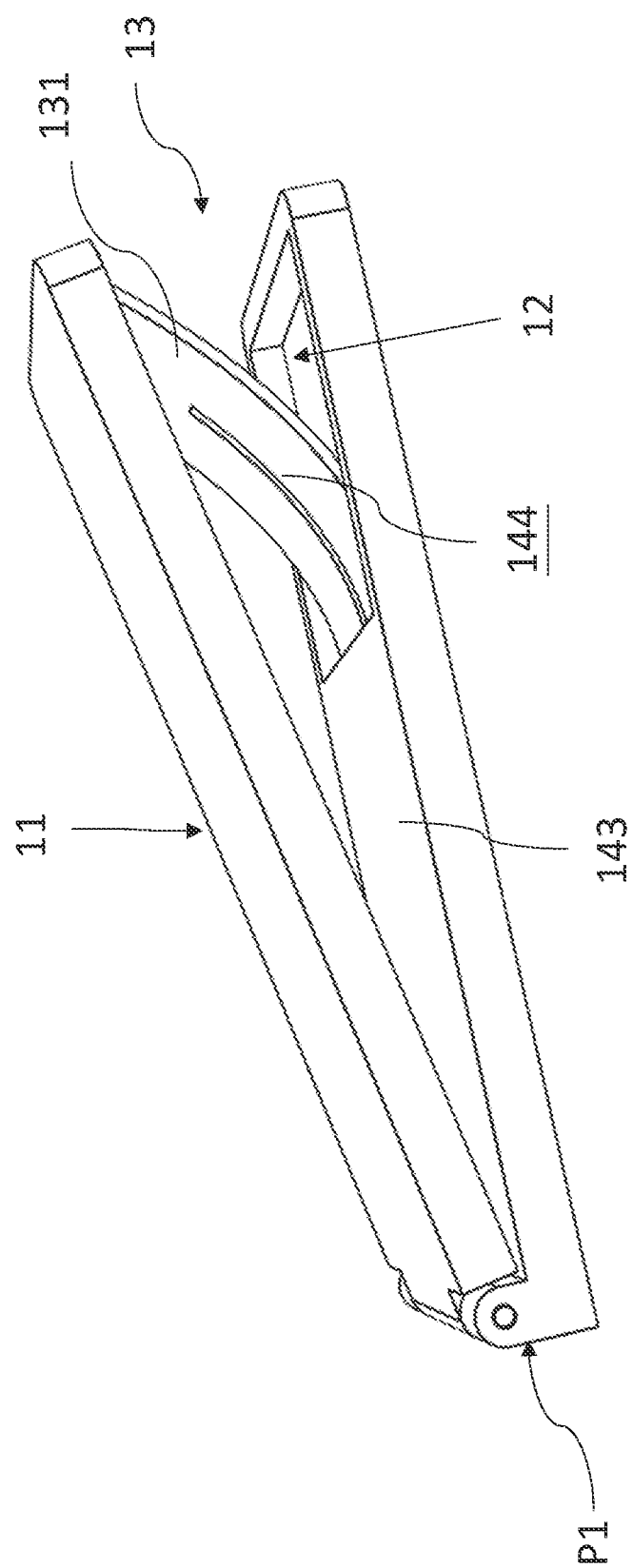
FIG. 1C is a perspective view of the first embodiment of the present invention, showing that the stand is on the way of being raised.
Figure 1D:
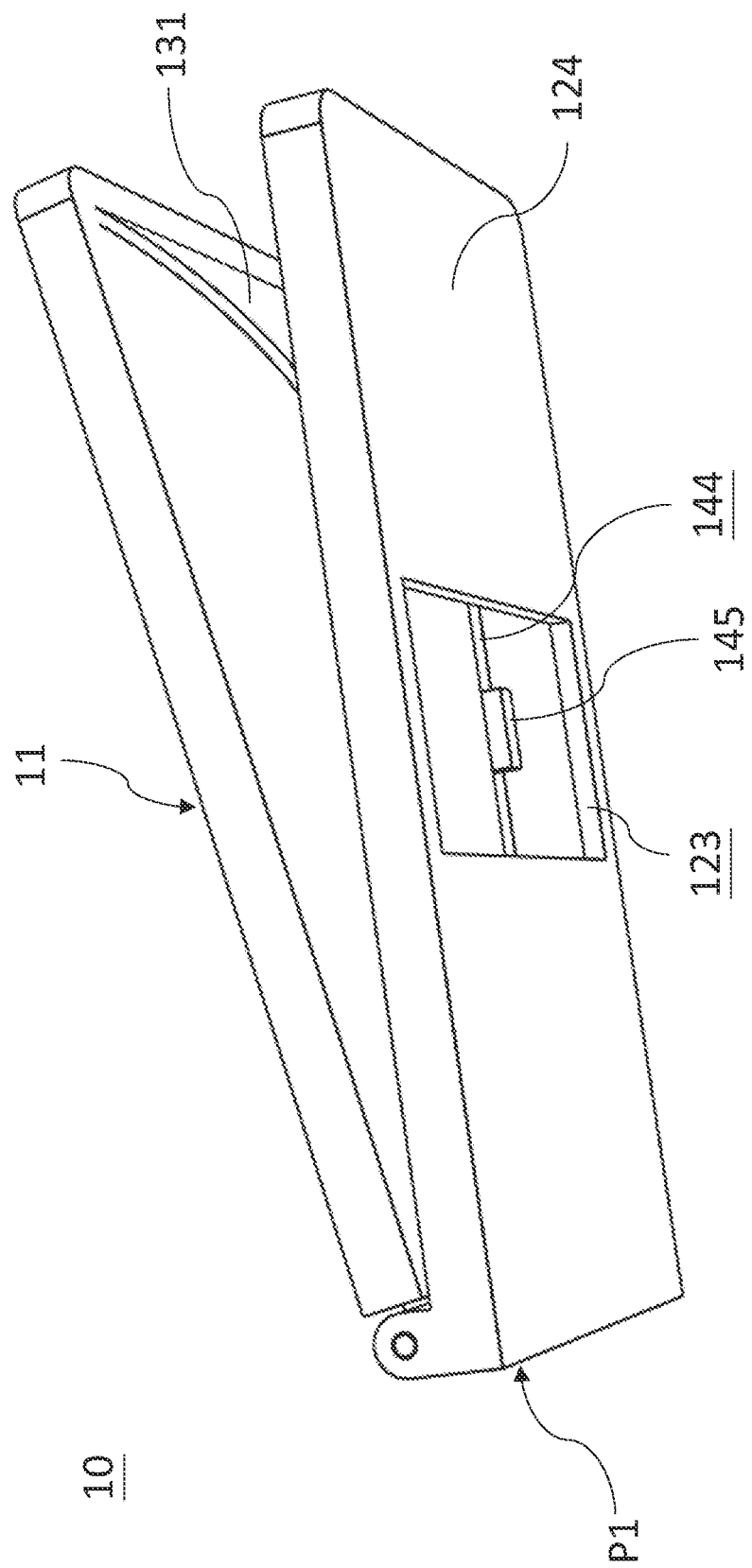
FIG. 1D is another perspective view of FIG. 1C.

As shown in FIGS. 1A, 1B, 1C and 1D, the stand 10 according to the first embodiment of the present invention includes a first plate 11, a second plate 12 and a lifting device 13 between the first plate 11 and the second plate 12. The first plate 11 has a first area and a second area opposite to the first area thereof. The second plate 12 also has a first area, and a second area opposite to the first area thereof. The first area of the first plate 11 is pivotally connected to the first area of the second plate 12 and form a pivot portion P1. The lifting device 13 is arranged between the first plate 11 and the second plate 12. Preferably, the first area of the first plate 11 is an inner end portion 111 of the first plate 11, and the second area of the first plate 11 is a free end portion 112 of the first plate 11, which is opposite to the inner end portion 111. The first area of the second plate 12 is an inner end portion 121 of the second plate 12, and the second area of the second plate 12 is a free end portion 122 of the second plate 12 which is opposite to the inner end portion 121. The lifting device 13 includes an elastic sheet 131 having a first end portion 1311 and a second end portion 1312. The first end portion 1311 is formed on an inner side of the free end portion 112 of the first plate 11.

The lifting device 13 further includes a limiting device which can guide the elastic sheet 131 to move along a length direction of the second plate 12 within a limited range. Preferably, the elastic sheet 131 is substantially shaped rectilinear. When the second end portion 1312 of the elastic sheet 131 and the pivot portion P1 proceed to generate a first relative displacement D1, the free end 112 of the first plate 11 can be driven to generate a second relative displacement D2 relative to the free end portion 122 of the second plate 12. Further, when the first relative displacement increases, the second relative displacement also increases. At this time, the elastic sheet 131 is gradually deformed into an arc shape by force, as shown from FIG. 1F to FIG. 1E. Then, when the first relative displacement D1 decreases, the second relative displacement also decreases. At this time, the elastic sheet 131 is gradually, elastically restored to its original rectilinear shape, as shown from FIG. 1E to FIG. 1F.

Figure 1E:
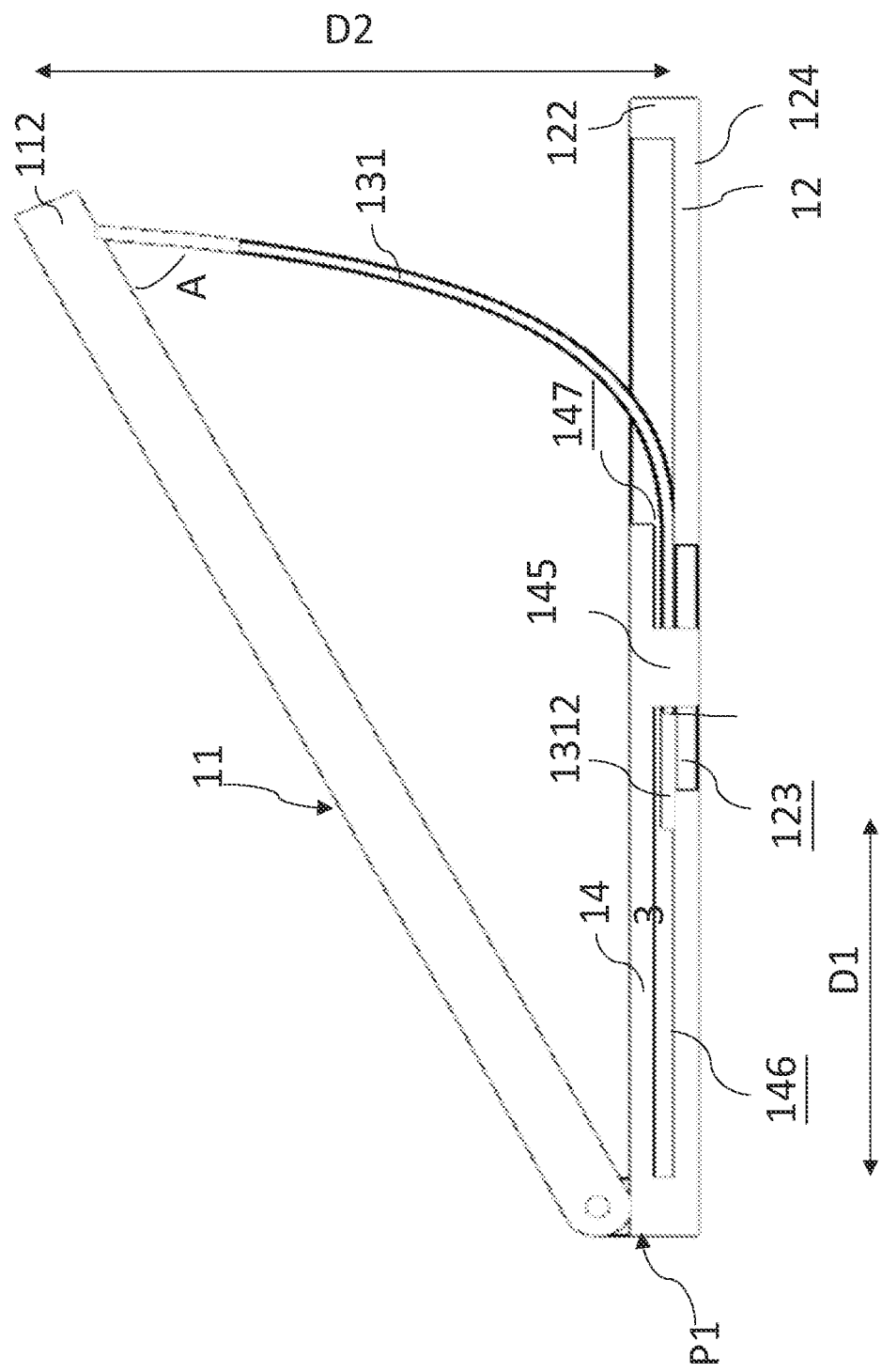
FIG. 1E is a schematic cross section view taken along the length direction of the slot in FIG. 1A.
Figure 1F:
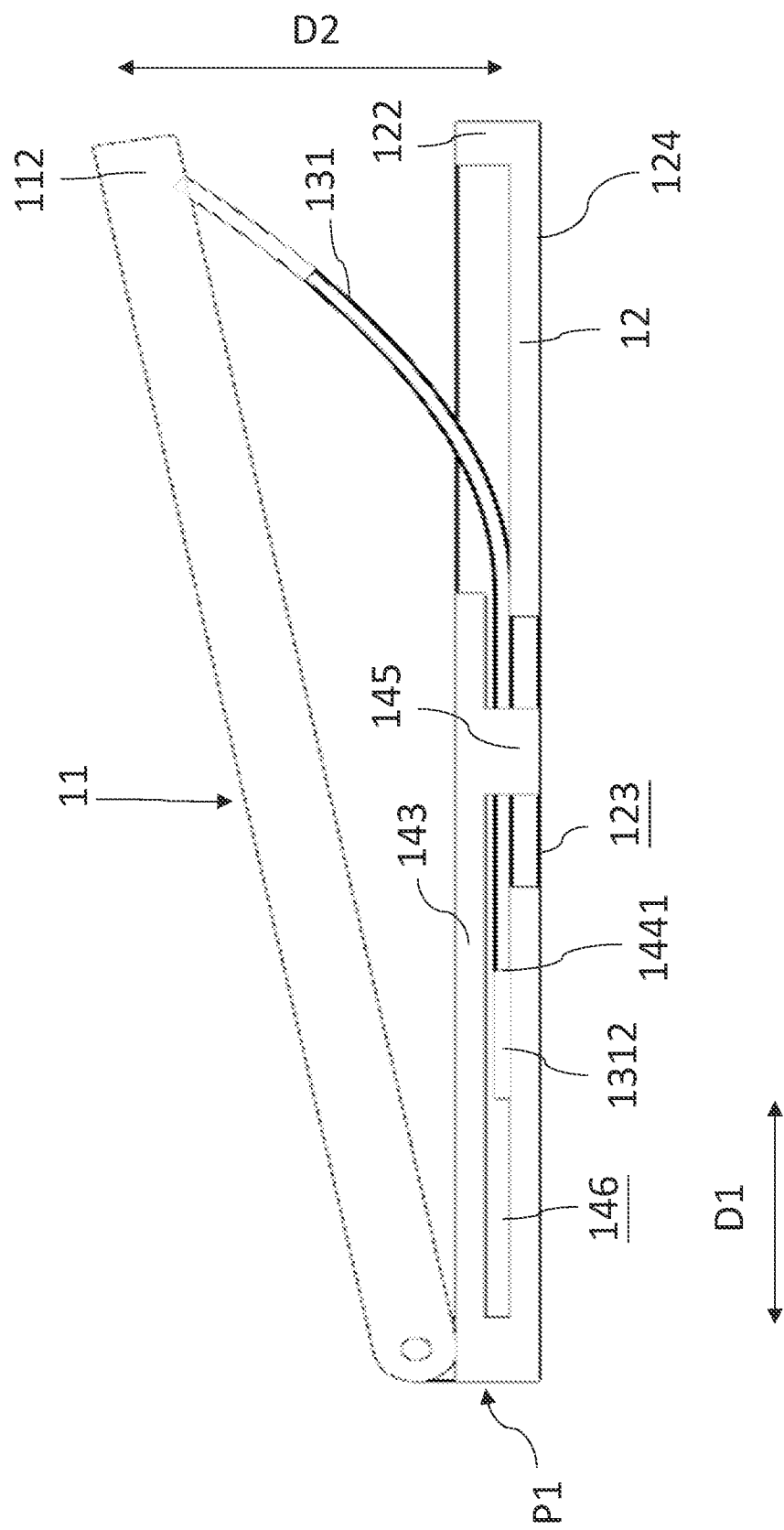
FIG. 1F is a schematic cross section view taken along the length direction of the slot in FIG. 1C.
Figure 1G:
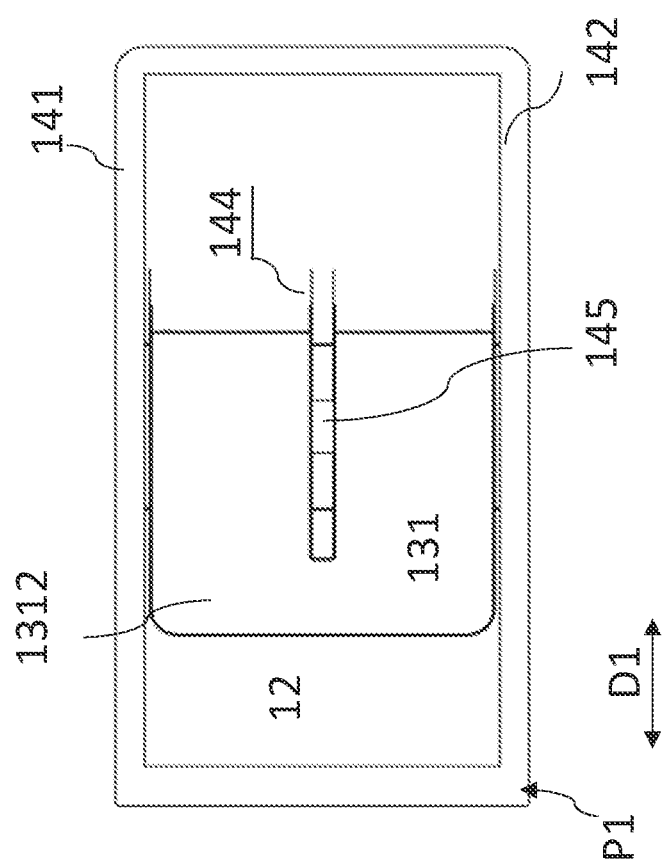
FIG. 1G is a schematic plan view showing the structural relationship under the cover plate in FIG. 1A.
Figure 1H:
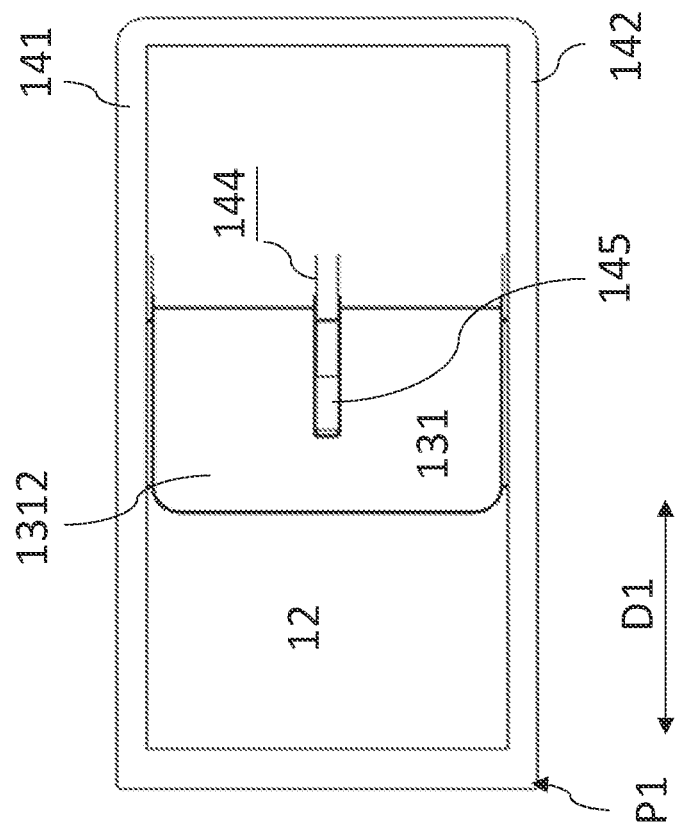
FIG. 1H is a schematic plan view showing the structural relationship under the cover plate in FIG. 1C.

In cross-reference to FIGS. 1A, 1C, 1D, 1E and 1F, preferably, the limiting device includes two sidewalls 141, 142, a cover 143, a slot 144 and a guide block 145. The two sidewalls 141 and 142 are respectively disposed on two opposite sides of the second plate 12 and along the length direction of the second plate 12, and form a sliding space 146 together with the second plate 12. The cover plate 143 bridges over the two sidewalls 141 and 142 and forms an inlet 147 together with the second plate 12, so that the elastic sheet 131 can enter the sliding space 146 from the inlet 147. The slot 144 is formed along a length direction of the elastic sheet 131 and has a dead end 1441. The guide block 145 is disposed under the cover 143 and passes through the slot 144 to limit the sliding of the elastic sheet 131 to move along the slot 144. FIGS. 1G and 1H which are the schematic plan views respectively corresponding to FIGS. 1E and 1F, clarify the relationship between the actions of the components such as the slot 144 and the guide block 145.

Figure 1I:
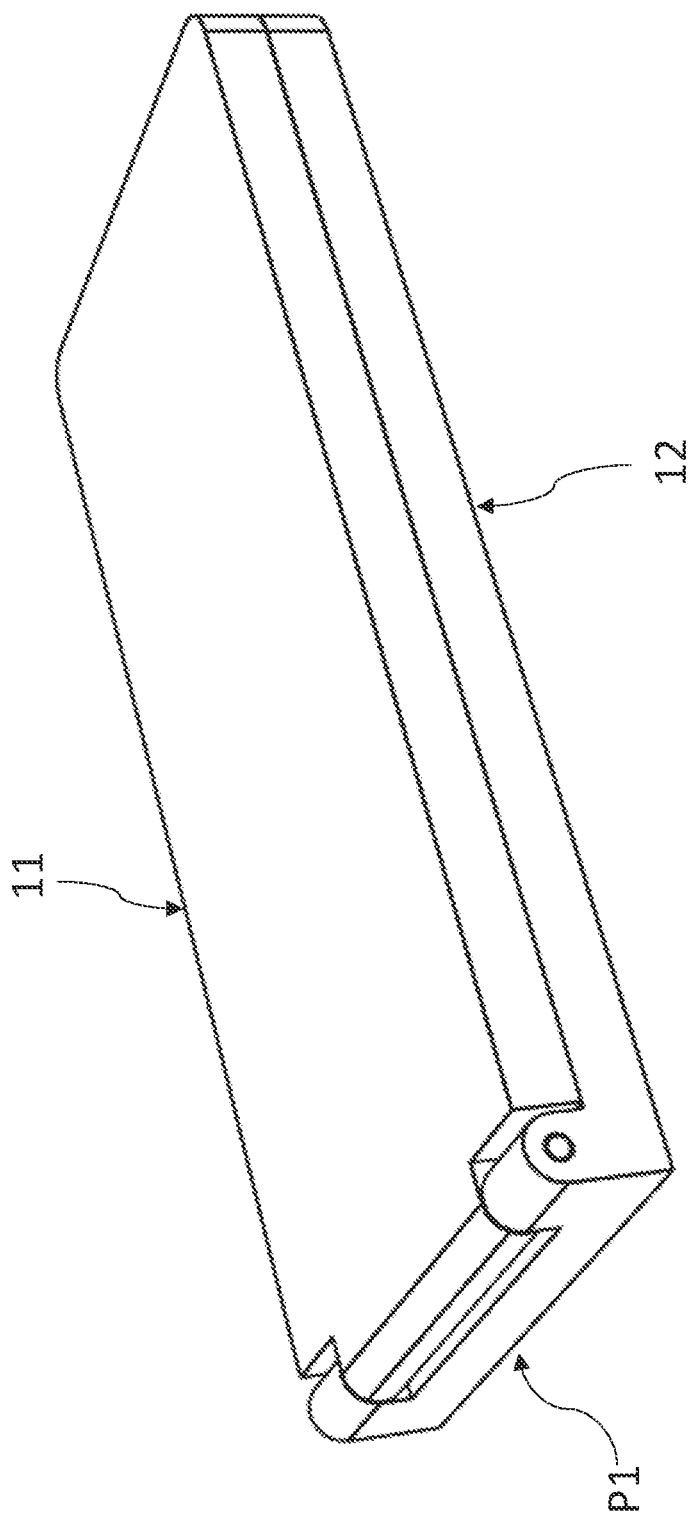
FIG. 1I is a perspective view of the first embodiment of the present invention, showing that the stand is in a collapse state.
Figure 1J:
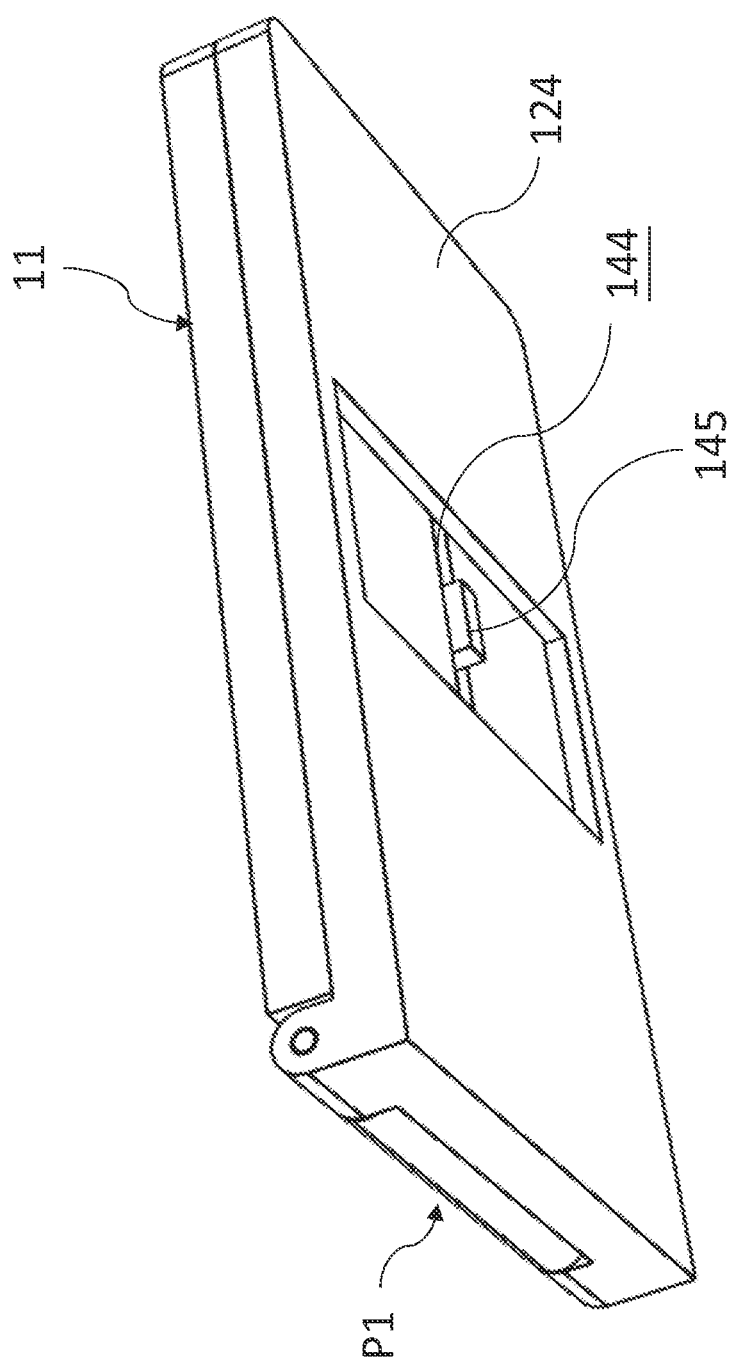
FIG. 1J is another perspective view of FIG. 1I.

In addition, the second plate 12 is provided with an opening 123 corresponding to the guide block 145, and the guide block 145 does not protrude from an outer surface 124 of the second plate 12. The length of the elastic sheet 131 is smaller than the length of the first plate 11. When the second end portion of the elastic sheet 131 is away from the pivot portion P1 to an extent where the dead end 1441 hits the guide block 145, a maximum distance is presented between the free end portion 112 of the first plate 11 and the free end portion 122 of the second plate 12, as shown in FIGS. 1A, 1E, and 1G. When the second end portion 1312 of the elastic sheet 131 is closest to the pivot portion P1, the first plate 11 and the second plate 12 is substantially parallel with each other, preferably to be in an overlapping state, as shown in FIGS. 1I and 1J. Furthermore, in this embodiment, In the situation that the second end portion of the elastic sheet 131 is away from the pivot portion P1 to an extent where the dead end 1441 hits the guide block 145, the more the area that the second end portion 1312 of the elastic sheet 131 is sandwiched between the cover plate 143 and the second plate 12, that is, the less the area of the second end portion 1312 exposed from the opening 123, the better the operation stability of the product can be obtained.

The following are the descriptions of the second, third, fourth, and fifth embodiments of the present invention. Their operating principle is similar to the first embodiment, that is, the first plate, the second plate, the elastic sheet, and the pivot portion are all basic and common elements. Changes only occur in the limiting device, so the same or similar components are simplified, and are not repeated hereinafter. Furthermore, the first area of the first plate is an inner end portion of the first plate, and the second area of the first plate is a free end portion of the first plate, opposite to the inner end portion thereof. Also, the first area of the second plate is an inner end portion of the second plate, and the second area of the second plate is a free end portion of the second plate, opposite to the inner end portion thereof. Therefore, the first area and the second area will be referred to directly with the preferred inner and free end portions. In addition, the drawings only represent the state where the stand is fully opened and raised. The state in the middle of the action and the state of being fully folded and closed is the same as the above concept of the first embodiment, and will not be specifically described.

Figure 2A:
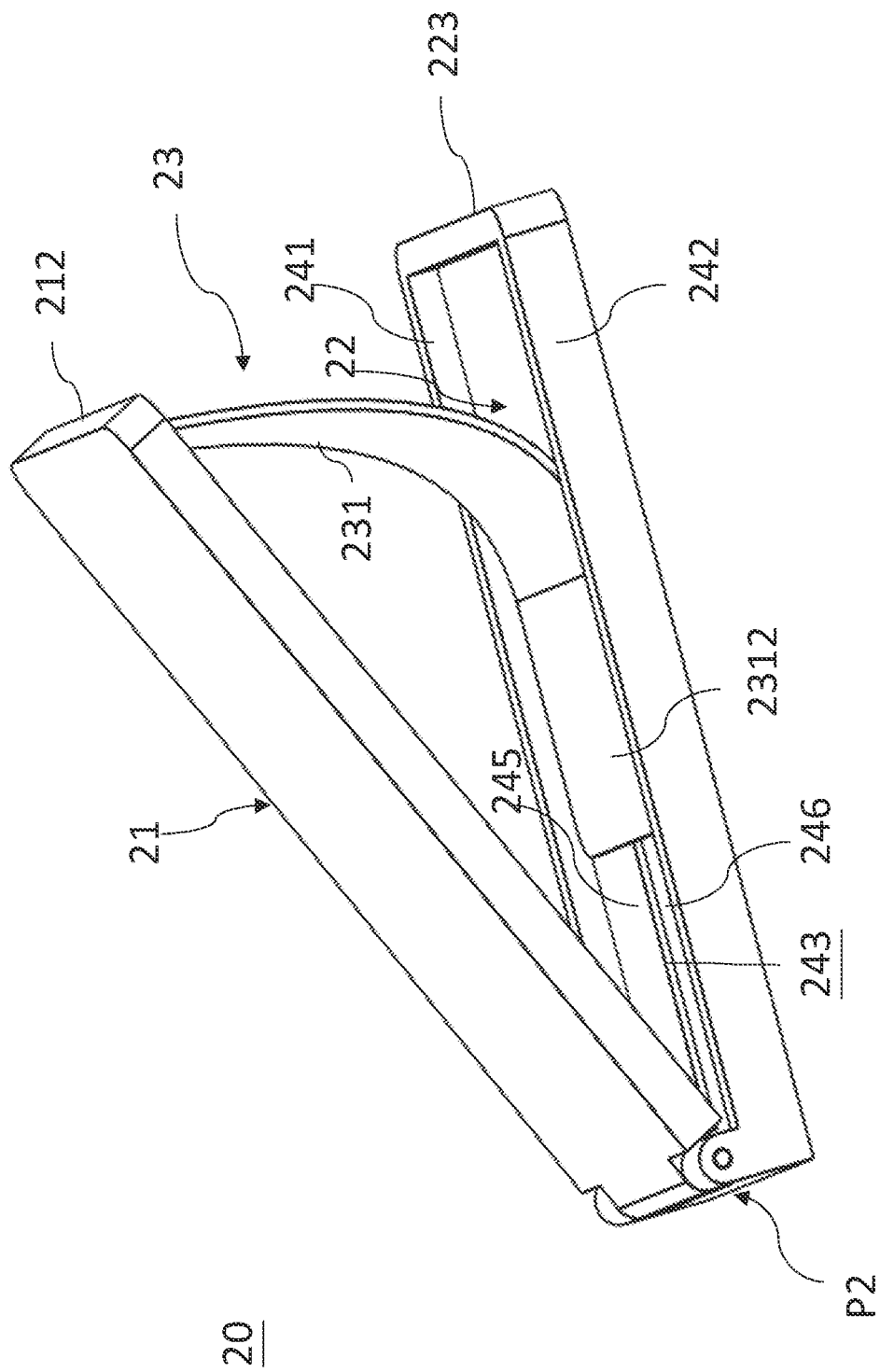
FIG. 2A is a perspective view of the second embodiment of the present invention, showing that the stand is fully raised.
Figure 2B:
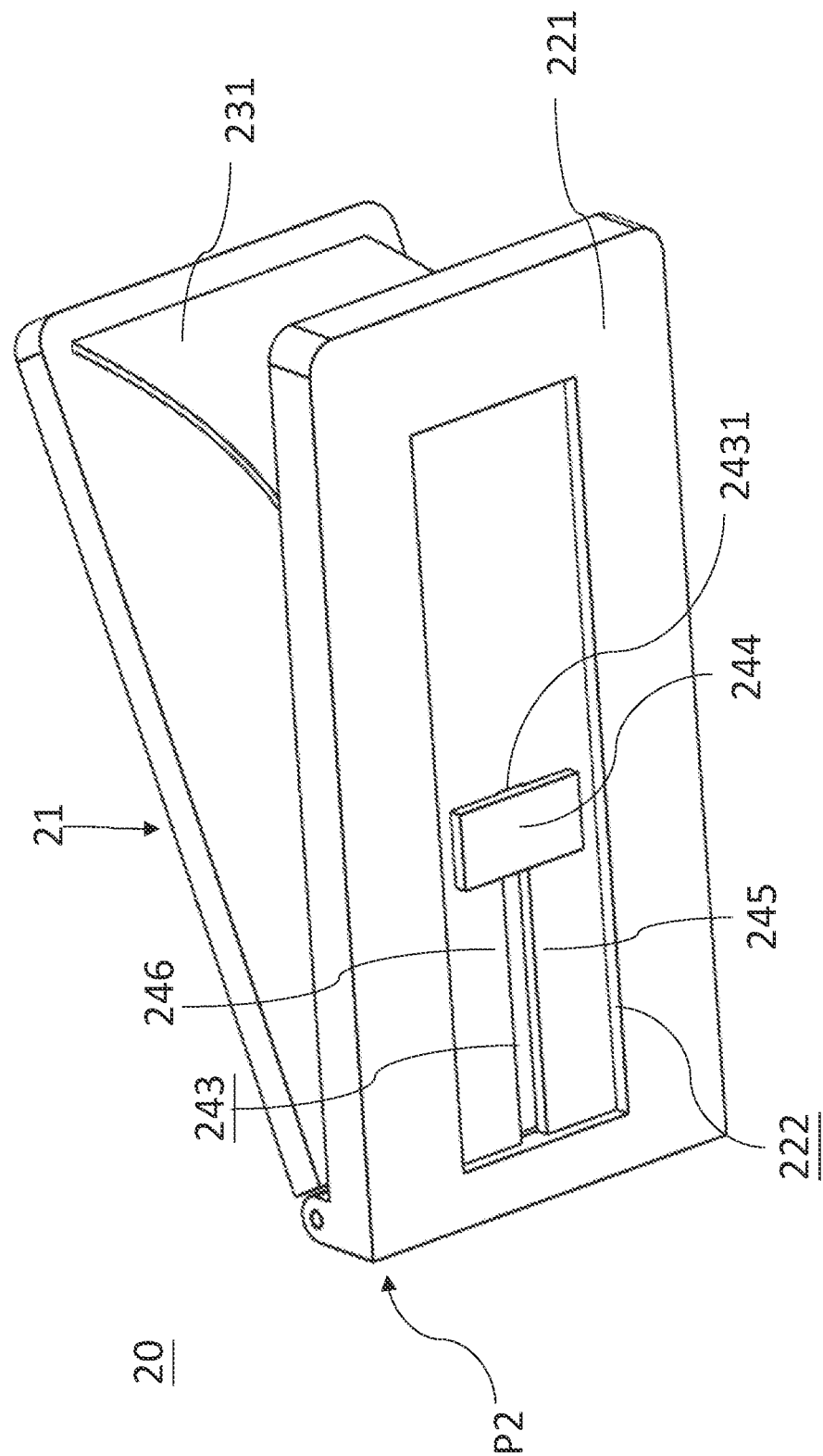
FIG. 2B is another perspective view of FIG. 2A.

FIGS. 2A and 2B show the second embodiment of the present invention, in which the stand 20 includes a first plate 21, a second plate 22, a lifting device 23, an elastic sheet 231 and a pivot portion P2. Preferably, the lifting device 23 includes a limiting device generally having two sidewalls 241 and 242, a slot 243 and a guide block 244. The two sidewalls 241 and 242 are disposed on two opposite sides of the second plate 22 and along a length direction of the second plate 22, and form a sliding space together with the second plate 22. The slot 243 is defined by two sides 245 and 246. The slot 243 is formed on the second plate 22 along a length direction of the second plate 22, and has a dead end 2431. The guide block 244 is disposed below the second end portion 2312 of the elastic sheet 231 and passes through the slot 243. The guide block 244 and the second end portion 2312 of the elastic sheet 231 sandwich the two sides 245 and 246 for limiting the elastic sheet 231 to slide along the slot 243.

Preferably, the second plate 22 has an outer surface 221 which is provided with an opening 222 relative to the area where the guide block 244 slides, and more preferably, the guide block 244 does not protrude from the outer surface 221 of the second plate 22, so that when the second plate 22 is attached to other accessories, such as the back plate of a mobile phone, the whole product can be more stable and beautiful.

In addition, the length of the elastic sheet 231 is less than the length of the first plate 21. When the guide block 244 is away from the pivot portion P2 and stops at the dead end 2431, a maximum distance is presented between the free end portion 212 of the first plate 21 and the free end portion 223 of the second plate 22, whereby the stand 20 is in a fully open state. When the guide block 244 is closest to the pivot portion P2, the first plate 21 and the second plate 22 can be substantially parallel or overlapping with each other. This way, the stand 20 becomes in a fully collapsed or folded state (not shown).

Figure 3:
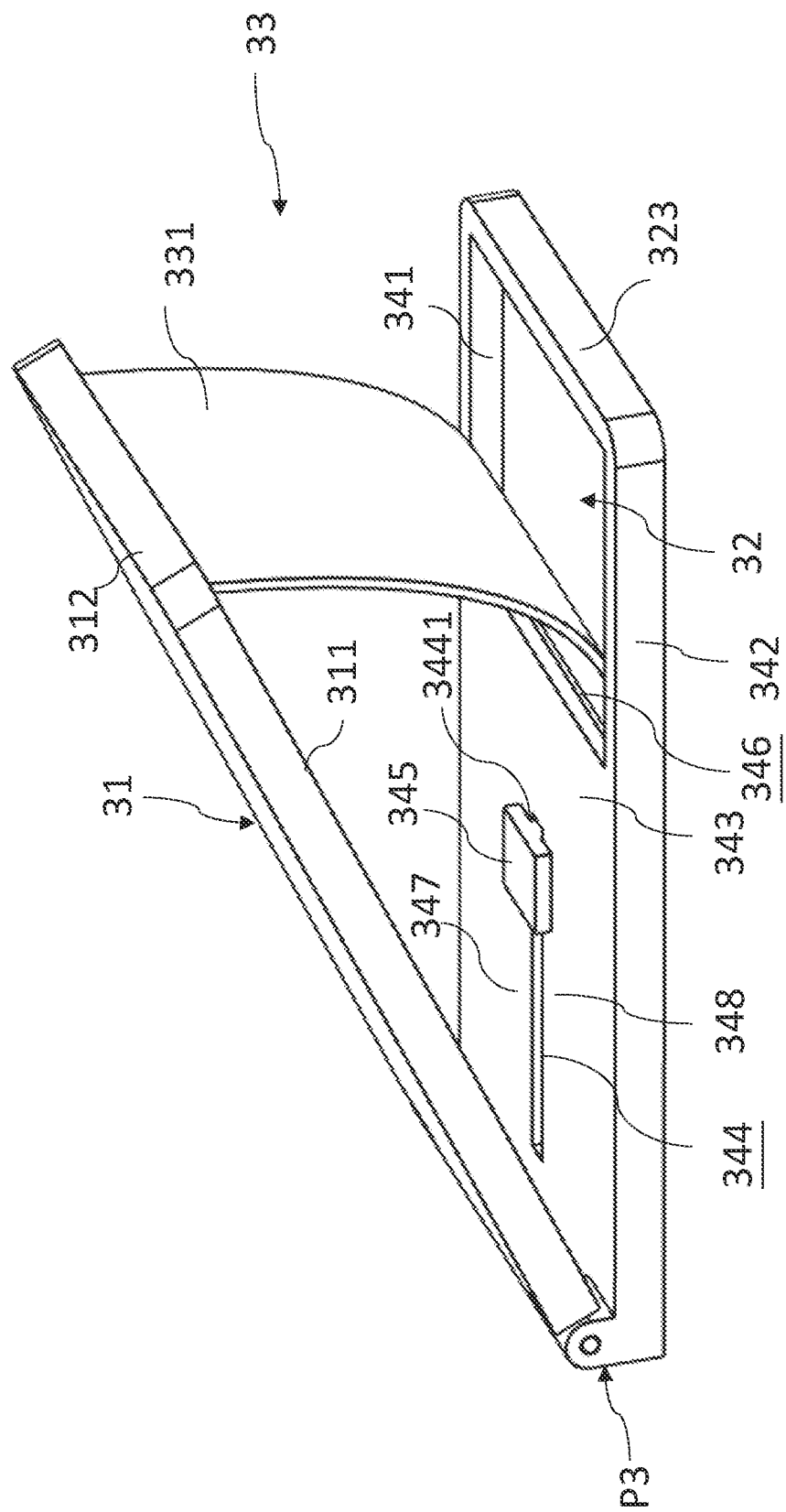
FIG. 3 is a perspective view of the third embodiment of the present invention, showing that the stand is fully raised.

As shown in FIG. 3, in the third embodiment of the present invention, the stand 30 includes a first plate 31, a second plate 32, a lifting device 33, an elastic sheet 331 and a pivot portion P3. Preferably, the lifting device 33 includes a limiting device generally having two sidewalls 341 and 342, a cover plate 343, a slot 344 and a guide block 345. The two sidewalls 341 and 342 are respectively disposed on two opposite sides of the second plate 32 along a length direction of the second plate 32, and form a sliding space together with the second plate 32. The cover plate 343 bridges the two sidewalls 341 and 342 of the second plate 32 and forms an inlet 346 together with the second plate 32 so that the elastic sheet 331 can enter the sliding space from the inlet 346. The slot 344 is defined by the two sides 347 and 348. The slot 344 is formed in a length direction of the cover plate 343 and has a dead end 3441. The guide block 345 is disposed above the second end portion of the elastic sheet 331 (in which the second end portion is hidden under the cover plate 343, and cannot be shown in FIG. 3), and passes through the slot 344. The guide block 345 and the second end portion of the elastic sheet 331 sandwich the two sides 347 and 348 to restrict the elastic sheet 331 from sliding along the slot 344 only.

More preferably, the first plate 31 has an inner surface 311 which is provided with a recess (not shown) relative to a position where the guide block 345 slides, so that when the stand 30 is fully folded (being not in use), the first plate 31 can be completely overlapped with the two sidewalls 341 and 342, and will not be raised by the guide block 345 protruding above the cover plate 343.

Similar to the above concept, the length of the elastic sheet 331 is less than the length of the first plate 31. When the guide block 345 is far away from the pivot portion P3 and stops at the dead end 3441, a maximum distance is presented between the free end portion 312 of the first plate 31 and the free end portion 323 of the second plate 32, whereby the stand 30 is in a fully open state. When the guide block 345 is closest to the pivot portion P3, the first plate 31 and the second plate 32 are substantially parallel with each other, whereby the stand 20 is in a fully folded state (not shown in the FIG.).

Figure 4:
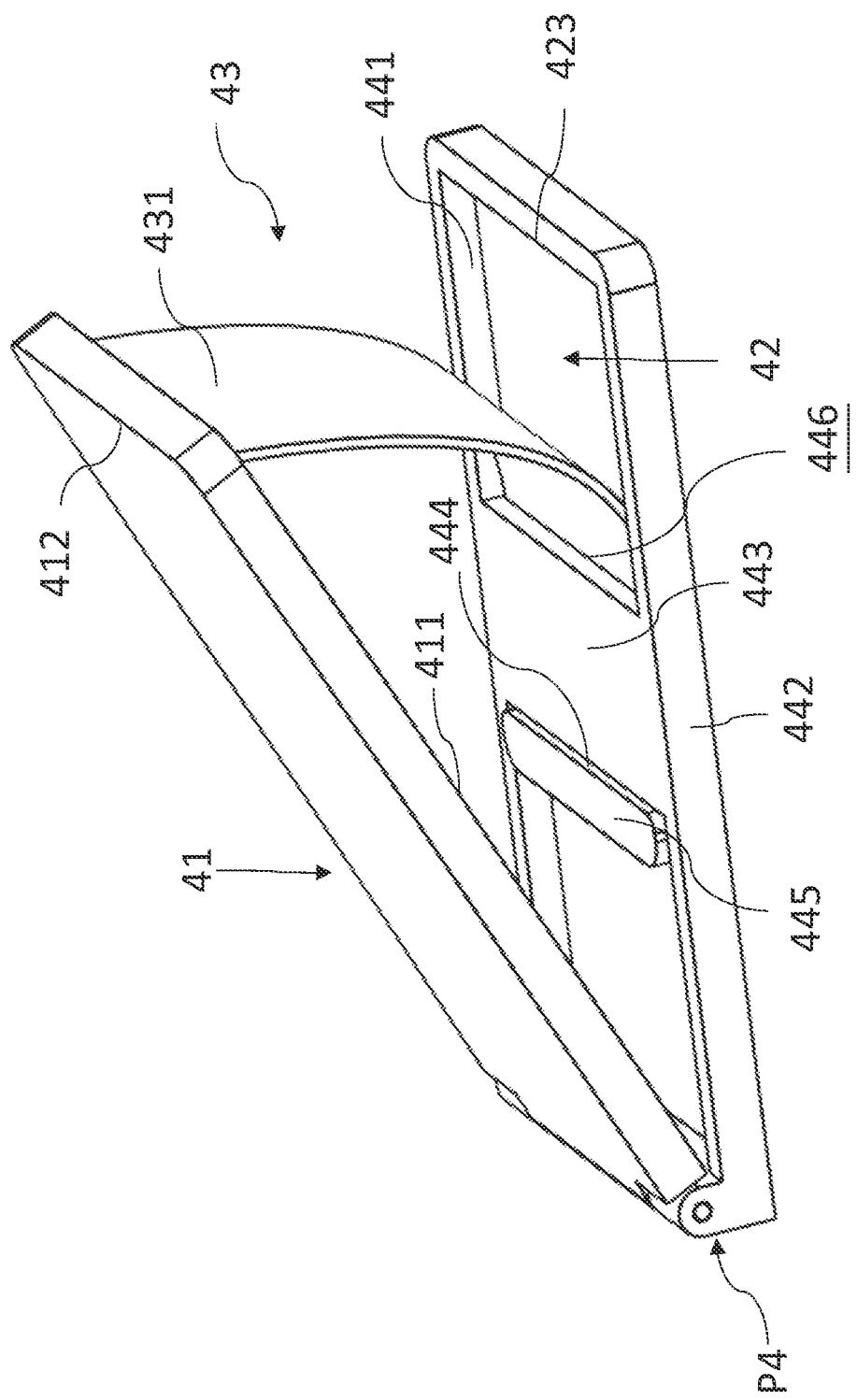
FIG. 4 is a perspective view of the fourth embodiment of the present invention, showing that the stand is fully raised.

As shown in FIG. 4, in the fourth embodiment of the present invention, the stand 40 includes a first plate 41, a second plate 42, a lifting device 43, an elastic sheet 431 and a pivot portion P4. Preferably, the lifting device 43 includes a limiting device generally having two sidewalls 441 and 442, a bridge 443, a dead end 444 and a guide block 445. The two sidewalls 441 and 442 are disposed on two opposite sides of the second plate 42 along a length direction of the second plate 42, and form a sliding space together with the second plate 42. The bridge 443 is disposed across the two sidewalls 441 and 442 of the second plate 42. An inlet 446 is formed between one of the sides of the bridge 443 and the second plate 42, so that the elastic sheet 431 can enter the sliding space from the inlet 446. The dead end 444 opposite to the inlet 446 is formed on the other side of the bridge 443, and the guide block 445 is disposed on the second end portion of the elastic sheet 431, in which the second end portion concealed under the bridge 443 cannot be shown from FIG. 4.

Preferably, an upper surface of the guide block 445 is substantially flush with an upper surface of the bridge 443 to ensure that when the stand 40 is fully folded, the first plate 41 can be completely overlapped with the two sidewalls 441, 442, without being blocked by the guide block 445. In some embodiments, the upper surface of the guide block 445 is slightly higher than the upper surface of the bridge 443. The first plate 41 has a recess (not shown) formed on an inner surface 411 relative to a position where the guide block 445 slides, whereby when the stand 40 is fully folded, the first plate 41 and the two sidewalls 441 and 442 can be completely overlapped, and are not pushed up by the guide block 445 higher than the bridge 443. Since the guide block 445 is higher than the bridge 443, the guide block 445 which is stopped by the dead end 444 of the bridge 443 is not easily malfunctioned to be erroneously brought under the bridge 443. This further improves the reliability of the product.

Similar to the above concept, the length of the elastic sheet 431 is less than the length of the first plate 41. When the guide block 445 is far away from the pivot portion P4 and stops at the dead end 444, a maximum distance is presented between the free end portion 412 of the first plate 41 and the free end portion 423 of the second plate 42, whereby the stand 40 is in a fully open state. When the guide block 445 is closest to the pivot portion P4, the first plate 41 and the second plate 42 are substantially parallel with each other, whereby the stand 40 is in a fully collapsed or folded state (not shown).

Figure 5A:
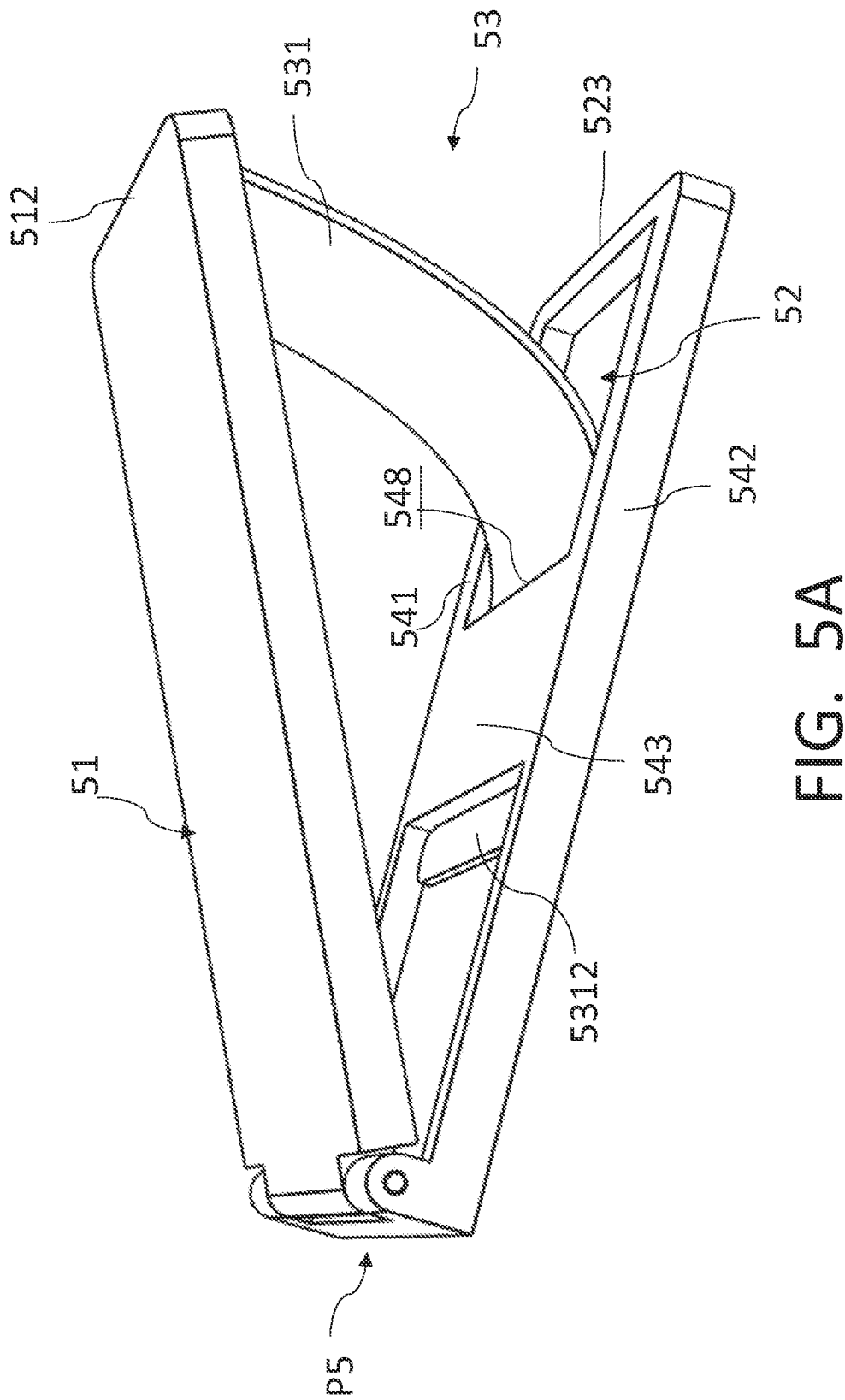
FIG. 5A is a perspective view of the fifth embodiment of the present invention, showing that the stand is fully raised.
Figure 5B:
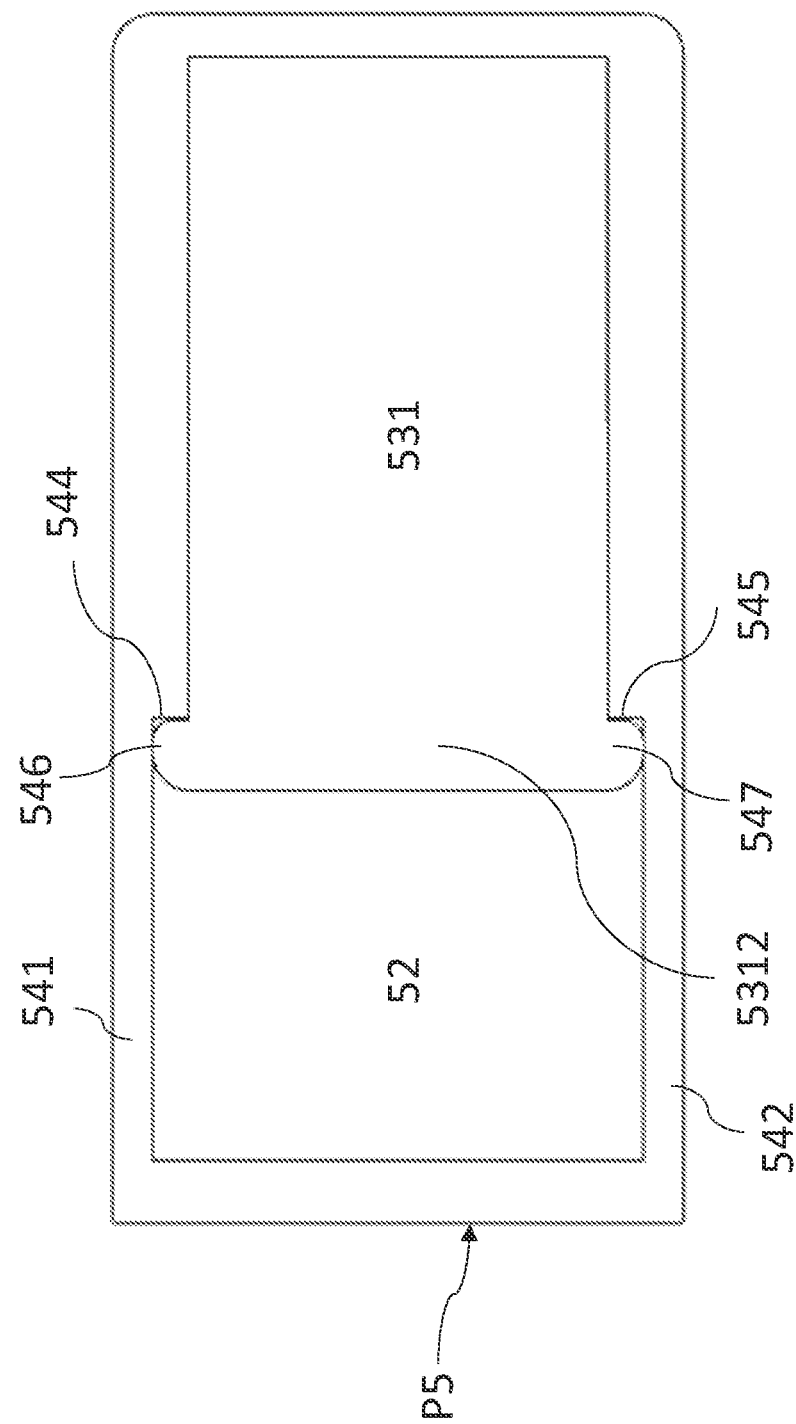
FIG. 5B is a schematic plan view of the structural relationship concealed under the bridge in FIG. 5A.

As shown in FIGS. 5A and 5B, in the fifth embodiment of the present invention, the stand 50 of includes a first plate 51, a second plate 52, a lifting device 53, an elastic sheet 531 and a pivot portion P5. Preferably, the lifting device 53 includes a limiting device generally having two sidewalls 541, 542, a bridge 543, two step portions 544, 545, and two protrusions 546, 547. The two sidewalls 541 and 542 are disposed on two opposite sides of the second plate 52 along a length direction of the second plate 52, and form a sliding space together with the second plate 52. The bridge 543 is disposed across the two sidewalls 541 and 542 of the second plate 52. An inlet 548 is formed between one of the sides of the bridge 543 and the second plate 52, so that the elastic sheet 531 can enter the sliding space through the inlet 548. The step portions 544 and 545 being located below the bridge 543 are respectively formed on the inner sides of the two sidewalls 541 and 542. The two protrusions 546 and 547 are disposed on the two outer sides of the second end portion 5312 of the elastic sheet 531 and protrude toward the two sidewalls 541 and 542, respectively.

Similar to the above concept, the length of the elastic sheet 531 is less than the length of the first plate 51. When the two protrusions 546, 547 are far away from the pivot portion P5 and are stopped by the two step portions 544, 545, respectively, a maximum distance is presented between the end portion 512 of the first plate 51 and the free end portion 523 of the second plate 52, whereby the stand 50 is in a fully open state. When both the two protrusions 546 and 547 are closest to the pivot portion P5, the first plate 51 and the second plate 52 are substantially parallel with each other, whereby the stand 50 is in a fully collapsed or folded state (not shown).

The above-mentioned pivot portion is not limited to the type as shown by P1, P2, P3, P4, and P5. Any measures that can couple the inner end of the first plate and the inner end of the second plate for freely pivoting, including substantially setting a pivot shaft (not shown), or even providing a plastic-made integral connector 60 that can be functioned as the pivot portion P6, in which one of the ends extends from the inner end 611 of the first plate 61, and the other end extends from the inner end 621 of the second plate 62, whereby forming a thinner weak zone 66 at the middle of the connector 60. This way, in the connector 60, the weak zone 66 can serve as a pivot portion to allow the first plate 61 and the second plate 62 to be in a pivot connection, as shown in FIG. 6A and FIG. 6B.

Figure 7:
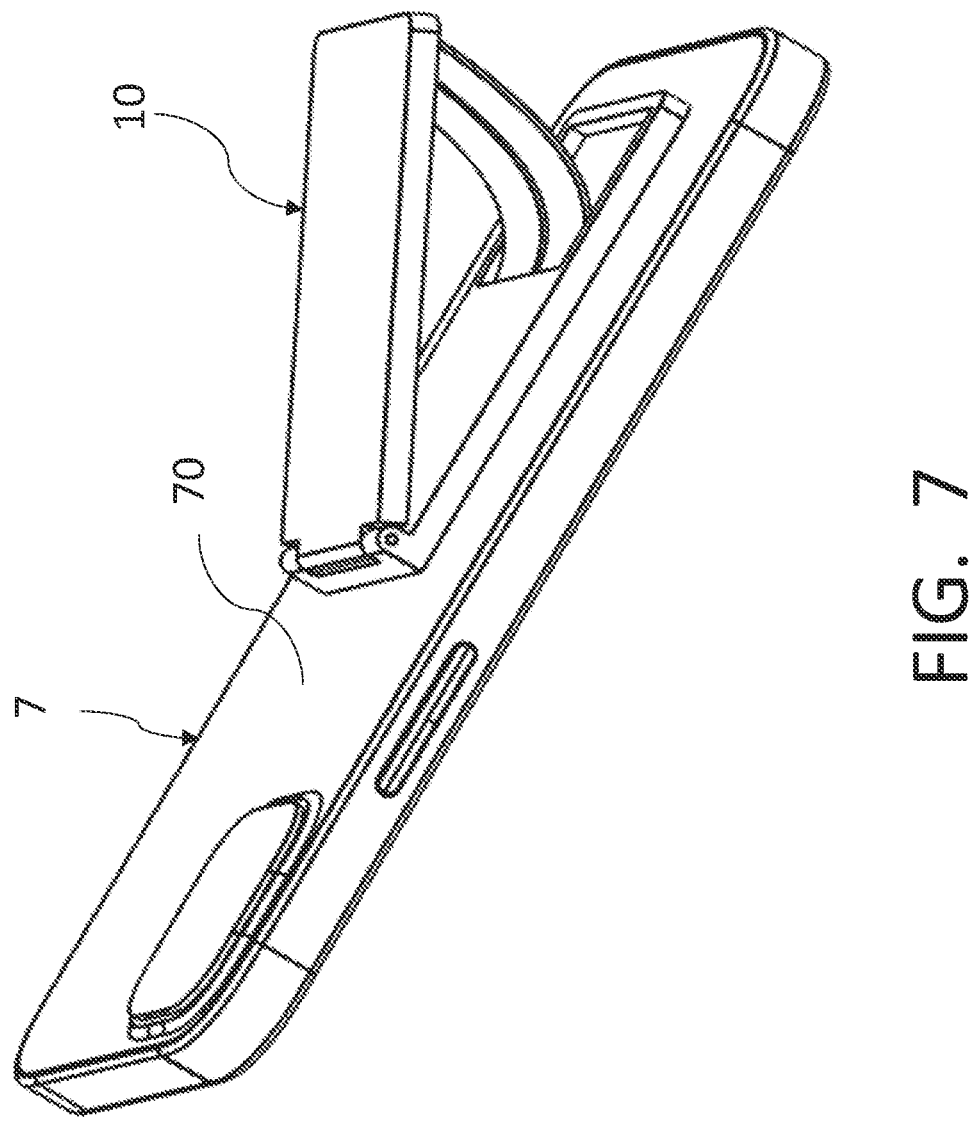
FIG. 7 is a schematic diagram of the state of the stand of the present invention, in which the stand is attached to a mobile phone.
Figure 8:
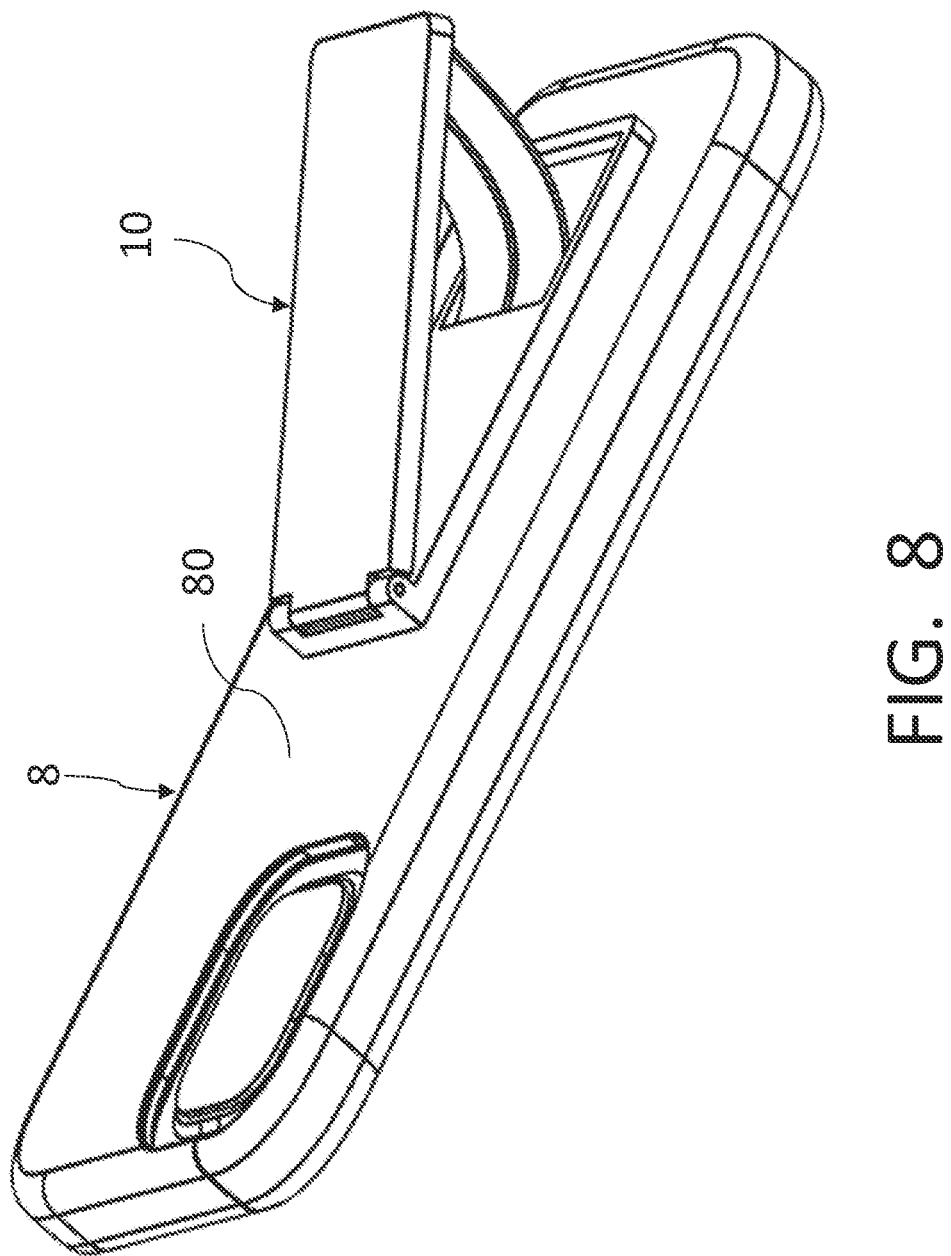
FIG. 8 is a schematic diagram of the state of the stand of the present invention, in which the stand is attached to the protective case of a mobile phone.
Figure 9:
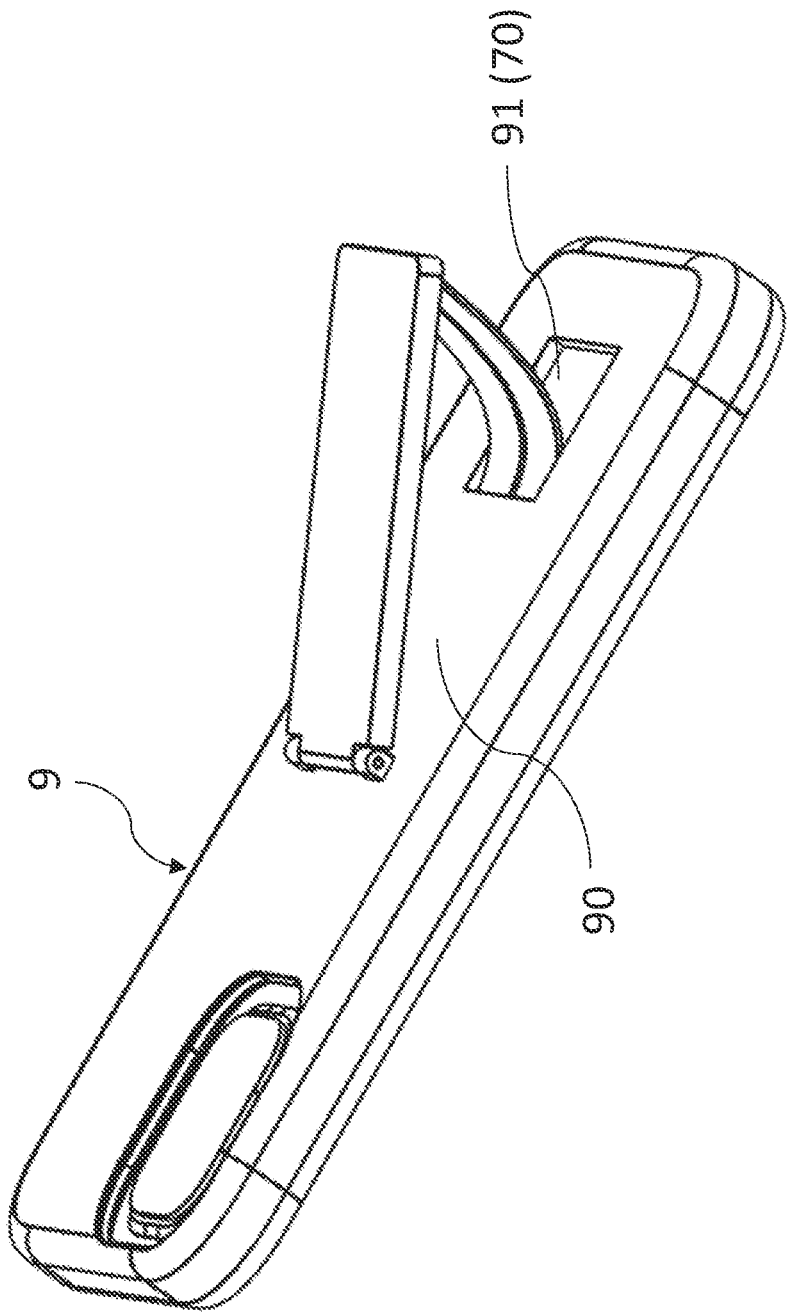
FIG. 9 is a schematic diagram of the state of the stand of the present invention, in which the stand is embedded together in the protective case of a mobile phone.

In practical application, taking the first embodiment as an example (the other embodiments are analogous to the first embodiment), the outer surface (e.g., the outer surface 124) of one of the first plate 11 and the second plate 12 can be provided with an attaching device (not shown), such as adhesive, double-sided tape, re-stickable PU adhesive or magnetic device, such as general magnet, rubber magnet or stronger neodymium iron boron (Nd—Fe—B) magnets and the like that are capable of being temporarily or permanently connected to the back panel 70 of the handheld device 7 or the back panel 80 of the protective case 8, as shown in FIG. 7 or FIG. 8. The stand 10 can also be directly embedded in the back plate 90 of the protective case 9 or integrally formed with the back plate 90 to be a part of the protective case 9, that is, forming a protective case with its own stand to further increase the functionality of the product. In an extensive concept, for example, the back plate 90 is integrally formed with the second plate, the two sidewalls and the cover plate of the stand. Structurally, the back plate 90 acts as the cover plate 143 of the stand 10, and the back plate 80 can add a lining layer 91 to act as the second plate of the stand. Alternatively, the back plate 70 of the handheld device 7 can be directly used as the second plate of the stand, as shown in FIG. 9.

Similarly, taking the first embodiment as an example too, one of the first plate 11 and the second plate 12 has been connected to the back plate 70 of the handheld device 7 or the back plate 80 of the protective case 8, and the outer surface of the other of the first plate 11 and the second plate 12 can be made by magnetic material or provided with an attaching device (not shown) in a similar way, such as magnets, so as to temporarily attach to a bracket that can be clipped to the air-conditioning vent or the dashboard in a vehicle.

The above are used to illustrate the preferred embodiments supporting the core technology of the present invention, so as to illustrate the technical characteristics of the present invention, but not to limit the technical measures provided by the present invention. In fact, the present invention provides means for supporting a handheld device, which includes means for pivoting the inner end of a first plate onto an inner end of the second plate; and means for lifting and lowering the free end portion of the first plate relative to the free end portion of the second plate. The lifting means further includes means for restricting the free end portion of the first plate from rising up to a first dead point relative to the free end portion of the second plate (i.e., as in the first embodiment, the dead end 1441 plays the function of being stopped by the guide block 145, and the same applies to the other embodiments), and lowering to a second dead point (i.e., as in the first embodiment, the two sidewalls 141 and 142 of the second plate 12 plays the function of stopping the first plate 11, and the same applies to the other embodiments). Of course, taking the first embodiment as an example (other embodiments apply too), the function of the second dead point can also be performed by a corresponding structure in which the first plate 11 is stopped by the cover plate 143; or by another corresponding structure in which the second end portion 1312 of the elastic sheet 131 is stopped by the inner end 121 of the second plate 12. In addition to the detailed description of the structure, material, and operation mode as set forth in the above-mentioned preferred embodiment, the possible equivalents are further listed below, but still do not limit the claimed invention as in the last paragraph:

1. In order to make the product operation more stable and reliable from the folding to the unfolding of the stand, the preferred thickness of the elastic sheet is set from 0.08 mm to 2 mm, more preferably from 0.2 mm to 1.0 mm. However, the material of the elastic sheet is not limited; it can be metal, plastic, or composite materials in various forms. If it is made of plastic, its preferred elasticity module (Gpa) is between 1 Gpa and 5 Gpa. If it is made of metal, its better elasticity module is between 70 Gpa to 195 Gpa.

2. Because the bent elastic sheet has an elastic restoring force that tend to return to be rectilinear. Therefore, when the stand is fully opened, the second end portion of the elastic sheet will produce a vertical pushing force making the stand tend to stop in that fully open state, and when the stand is fully folded, since the elastic sheet has returned to its original rectilinear shape, the stand will naturally tend to be in that folded state, thereby providing two obvious stage operations (i.e., two stages of fully open and fully folded). Of course, since the elastic sheet is guided by the limiting device, there is a certain frictional force with other components in contact, such as the second plate, sidewall, cover plate or bridge, etc. Therefore, in terms of design, the elastic sheet can also be appropriately increased its friction force with the elements on the operational it contacts, thereby making it possible to stop anywhere during the operation. That is, the first plate can be lifted and lowered relative to the second plate at any place as desired.

3. In operation, the user will pull up or press down the second area (i.e., the free end portion) of the first plate to keep it away from or close to the second area of the second plate. Therefore, for the purpose of enhancing the operation reliability and stability, when the first plate is raised up to the first dead point, the included angle A between the dashed line connecting the first end portion (i.e., the connection position 6311 where the elastic sheet 631 and the first plate 61 meet) and the second end portion (i.e., the other end 6312 of the bent elastic sheet 631) of the bent elastic sheet 631, and the dashed line along the second plate 62 (as shown in FIG. 6A) is recommended to be set between 20° and 50°, preferably between 30° to 45°.

What is claimed is:

1. A stand for a handheld device, comprising:
a first plate having a first area and a second area opposite to the first area thereof; a second plate having a first area and a second area opposite to the first area thereof; wherein the first area of the first plate is pivotally connected to the first area of the second plate, to form a pivot portion;
a lifting device arranged between the first plate and the second plate; the lifting device including:
an elastic sheet having a first end portion and a second end portion, the first end portion disposed on the second area of the first plate;
a limiting device adapted to guide the elastic sheet to move along a length direction of the second plate within a limited range; when the second end portion of the elastic sheet and the pivot portion proceed to a first relative displacement, the second area of the first plate and the second area of the second plate is moved to create a second relative displacement, wherein when the first relative displacement becomes smaller, the second relative displacement becomes smaller; when the first relative displacement becomes larger, the second relative displacement becomes larger.

2. The stand according to claim 1, wherein the first area of the first plate is an inner end of the first plate, and the second area of the first plate is a free end portion of the first plate, which is opposite to the inner end of the first plate; the first area of the second plate is an inner end of the second plate, and the second area of the second plate is a free end portion of the second plate, which is opposite to the inner end of the second plate.

3. The stand according to claim 2, wherein the limiting device includes: two sidewalls, disposed on two opposite sides of the second plate, and forming a sliding space together with the second plate;
a cover plate bridging the two sidewalls of the second plate and forming an inlet with the second plate, so that the elastic sheet is adapted to enter the sliding space from the inlet;
a slot, formed on a length direction of the elastic sheet and having a dead end;
a guide block, disposed under the cover plate and passing through the slot to restrict the elastic sheet to slide along the slot.

4. The stand according to claim 3, wherein the second plate is provided with an opening which corresponds to the guide block, and the guide block does not protrude from an outer surface of the second plate.

5. The stand according to claim 4, wherein the elastic sheet has a length less than a length of the first plate; when the second end portion of the elastic sheet is far away from the pivot portion to an extent that the dead end hits the guide block, a maximum distance is presented between the second area of the first plate and the second area of the second plate; when the second end portion of the elastic sheet is closest to the pivot portion, the first plate and the second plate are substantially parallel with each other.

6. The stand according to claim 2, wherein the limiting device includes:
two sidewalls, disposed on two opposite sides of the second plate and forming a sliding space together with the second plate;
a slot, defined by two sides, the slot being formed along a length direction of the second plate and having a dead end;
a guide block, disposed below the second end portion of the elastic sheet and passing through the slot, the guide block and the second end portion of the elastic sheet sandwiching the two sides to restrict the elastic sheet to move along the slot.

7. The stand according to claim 6, wherein the second plate has an outer surface being provided with an opening relative to the area where the guide block slides, and the guide block does not protrude out from the outer surface of the second plate.

8. The stand according to claim 7, wherein the elastic sheet has a length less than a length of the first plate; when the guide block is far away from the pivot portion to an extent that is stopped by the dead end, a maximum distance is presented between the second area of the first plate and the second area of the second plate; when the guide block is closest to the pivot portion, the first plate and the second plate are substantially parallel with each other.

9. The stand according to claim 2, wherein the limiting device includes:
two sidewalls, disposed on two opposite sides of the second plate and forming a sliding space together with the second plate;
a cover plate bridging the two sidewalls of the second plate and forming an inlet with the second plate, so that the elastic sheet is adapted to enter the sliding space from the inlet;
a slot, defined by two sides, the slot formed in a length direction of the cover plate and having a dead end;

a guide block, disposed above the second end portion of the elastic sheet and passing through the slot, the guide block and the second end portion of the elastic sheet sandwiching the two sides to restrict the elastic sheet to move along the slot.

10. The stand according to claim 9, wherein the first plate has an inner surface being provided with a recess corresponding to the guide block, so that when the stand is fully folded, the first plate is adapted to completely overlap the two sidewalls.

11. The stand according to claim 10, wherein the elastic sheet has a length less than a length of the first plate; when the guide block is far away from the pivot portion to an extent that is stopped by the dead end, a maximum distance is presented between the second area of the first plate and the second area of the second plate; when the guide block is closest to the pivot portion, the first plate and the second plate are substantially parallel with each other.

12. The stand according to claim 2, wherein the limiting device includes:
two sidewalls, disposed on two opposite sides of the second plate and forming a sliding space together with the second plate;
a bridge, disposed across two sidewalls of the second plate, and an inlet is formed between one of two sides of the bridge and the second plate, so that the elastic sheet is adapted to enter the sliding space from the inlet;
a dead end, formed on the other side of the bridge;
a guide block, disposed above the second end portion of the elastic sheet.

13. The stand according to claim 12, wherein an upper surface of the guide block is substantially flush with an upper surface of the bridge.

14. The stand according to claim 13, wherein the elastic sheet has a length less than a length of the first plate; when the guide block is far away from the pivot portion to an extent that is stopped by the dead end, a maximum distance is presented between the second area of the first plate and the second area of the second plate; when the guide block is closest to the pivot portion, the first plate and the second plate are substantially parallel with each other.

15. The stand according to claim 2, wherein the limiting device includes:
two sidewalls, disposed on two opposite sides of the second plate and forming a sliding space together with the second plate;
a bridge, disposed across two sidewalls of the second plate, and an inlet is formed between one of two sides of the bridge and the second plate, so that the elastic sheet is adapted to enter the sliding space from the inlet;
two step portions, respectively formed on inner sides of the two sidewalls;
two protrusions, respectively formed on two outer sides of the second end portion of the elastic sheet.

16. The stand according to claim 15, wherein the elastic sheet has a length less than a length of the first plate; when the two protrusions are far away from the pivot portion to an extent that is stopped by the two step portions, respectively, a maximum distance is presented between the second area of the first plate and the second area of the second plate; when the guide block is closest to the pivot portion, the first plate and the second plate are substantially parallel with each other.

17. The stand according to claim 1, wherein the first area of the first plate, the first area of the second plate and the pivot portion are integrally formed from plastic material.

18. The stand according to claim 1, further comprising an attaching device disposed on an outer surface of at least one of the first plate and the second plate.

19. The stand according to claim 18, wherein the attaching device is one of a double-sided adhesive tape, a re-stickable PU adhesive, and a magnetic device.

20. A protective case for a handheld device, comprising the stand according to claim 3, wherein the protective case has a back plate, which includes the second plate, the two sidewalls, the cover plate, and the guide block.

* * * * *